(12) United States Patent
Dolgin et al.

(10) Patent No.: US 11,984,922 B2
(45) Date of Patent: May 14, 2024

(54) DIFFERENTIAL PROBE WITH SINGLE TRANSCEIVER ANTENNA

(71) Applicant: Raytheon Company, Waltham, MA (US)

(72) Inventors: Benjamin P. Dolgin, Alexandria, VA (US); Thomas G. Lavedas, Moneta, VA (US); Joseph J. Fraundorfer, Bethesda, MD (US)

(73) Assignee: Raytheon Company, Tewksbury, MA (US)

( * ) Notice: Subject to any disclaimer, the term of this patent is extended or adjusted under 35 U.S.C. 154(b) by 185 days.

(21) Appl. No.: 17/538,305

(22) Filed: Nov. 30, 2021

(65) Prior Publication Data

US 2023/0170926 A1 Jun. 1, 2023

(51) Int. Cl.
*H04B 1/38* (2015.01)
*H04B 1/18* (2006.01)
*H04B 1/3805* (2015.01)

(52) U.S. Cl.
CPC .................. *H04B 1/38* (2013.01); *H04B 1/18* (2013.01); *H04B 2001/3811* (2013.01)

(58) Field of Classification Search
CPC ........................................................ H04B 1/38
See application file for complete search history.

(56) References Cited

U.S. PATENT DOCUMENTS

| | | | |
|---|---|---|---|
| 1,911,234 A | 5/1933 | Meyer | |
| 3,284,801 A | 11/1966 | Bryant | |
| 3,453,630 A | 7/1969 | Thompson | |
| 3,774,221 A | 11/1973 | Francis | |
| 3,823,403 A | 7/1974 | Walter et al. | |
| 3,950,756 A | 4/1976 | Tisler | |
| 4,160,978 A | 7/1979 | DuHamel | |

(Continued)

FOREIGN PATENT DOCUMENTS

| | | |
|---|---|---|
| EP | 2336754 A1 | 6/2011 |
| JP | H11-313017 A | 11/1999 |

(Continued)

OTHER PUBLICATIONS

Alegre Science, "Sodium Analyzer Without Sample Prep Fast Sodium Analysis in Food and Liquids", 2016, 7 pages.

(Continued)

*Primary Examiner* — Hsinchun Liao

(57) ABSTRACT

An apparatus includes an antenna, a transmitter configured to generate an outgoing electrical signal, and a receiver configured to receive an incoming electrical signal. The apparatus also includes a transformer configured to couple the antenna and the transmitter such that the outgoing electrical signal causes the antenna to radiate outgoing electromagnetic energy, couple the antenna and the receiver such that the incoming electrical signal is based on incoming electromagnetic energy received by the antenna, and electrically isolate the transmitter and the receiver. The antenna may include inner and outer compensating coils, the compensating coils may be configured to additively radiate the outgoing electromagnetic energy, and the incoming electrical signal may be based on a difference between the incoming electromagnetic energy as received by the compensating coils.

20 Claims, 10 Drawing Sheets

(56) References Cited

U.S. PATENT DOCUMENTS

| | | | |
|---|---|---|---|
| 4,217,550 A | 8/1980 | Blassel et al. |
| 4,260,990 A | 4/1981 | Lichtblau |
| 4,375,289 A | 3/1983 | Schmall et al. |
| 4,680,591 A | 7/1987 | Axford et al. |
| 4,791,285 A | 12/1988 | Ohki |
| 4,920,352 A | 4/1990 | Martensson et al. |
| 4,977,614 A | 12/1990 | Kurcbart |
| 5,041,791 A | 8/1991 | Ackerman et al. |
| 5,061,941 A | 10/1991 | Lizzi et al. |
| 5,101,214 A | 3/1992 | Ohtsuka et al. |
| 5,128,686 A | 7/1992 | Tan et al. |
| 5,206,592 A | 4/1993 | Buess et al. |
| 5,221,902 A | 6/1993 | Jones et al. |
| 5,227,725 A | 7/1993 | Cory et al. |
| H1218 H | 8/1993 | Cory et al. |
| 5,233,300 A | 8/1993 | Buess et al. |
| 5,237,165 A | 8/1993 | Tingley, III |
| 5,321,412 A | 6/1994 | Kopp et al. |
| 5,459,451 A | 10/1995 | Crossfield et al. |
| 5,513,383 A | 4/1996 | Tsao |
| 5,572,226 A | 11/1996 | Tuttle |
| 5,602,556 A | 2/1997 | Bowers |
| 5,608,321 A | 3/1997 | Garroway et al. |
| 5,804,967 A | 9/1998 | Miller et al. |
| 5,817,207 A | 10/1998 | Leighton |
| 5,903,242 A | 5/1999 | Tsuru et al. |
| 5,914,692 A | 6/1999 | Bowers et al. |
| 5,945,958 A | 8/1999 | Staufer et al. |
| 6,031,508 A | 2/2000 | Shizuka et al. |
| 6,054,856 A | 4/2000 | Garroway et al. |
| 6,147,605 A | 11/2000 | Vega et al. |
| 6,194,898 B1 | 2/2001 | Magnuson et al. |
| 6,195,006 B1 | 2/2001 | Bowers et al. |
| 6,204,764 B1 | 3/2001 | Maloney |
| 6,208,235 B1 | 3/2001 | Trontelj |
| 6,208,874 B1 | 3/2001 | Rudisill et al. |
| 6,281,794 B1 | 8/2001 | Duan et al. |
| 6,411,208 B1 | 6/2002 | Buess et al. |
| 6,420,872 B1 | 7/2002 | Garroway et al. |
| 6,429,768 B1 | 8/2002 | Flick |
| 6,522,135 B2 | 2/2003 | Miller et al. |
| 6,535,175 B2 | 3/2003 | Brady et al. |
| 6,597,318 B1 | 7/2003 | Parsche et al. |
| 6,696,952 B2 | 2/2004 | Zirbes |
| 6,777,937 B1 | 8/2004 | Miller et al. |
| 6,814,284 B2 | 11/2004 | Ehlers et al. |
| 6,825,754 B1 | 11/2004 | Rolin |
| 6,900,633 B2 | 5/2005 | Sauer et al. |
| 6,956,476 B2 | 10/2005 | Buess et al. |
| 6,970,141 B2 | 11/2005 | Copeland et al. |
| 6,989,750 B2 | 1/2006 | Shanks et al. |
| 7,019,651 B2 | 3/2006 | Hall et al. |
| 7,042,419 B2 | 5/2006 | Werner et al. |
| 7,049,814 B2 | 5/2006 | Mann |
| 7,064,668 B2 | 6/2006 | Porad |
| 7,100,835 B2 | 9/2006 | Selker |
| 7,132,942 B1 | 11/2006 | Buess et al. |
| H2177 H | 1/2007 | Sauer et al. |
| 7,215,293 B2 | 5/2007 | Chen et al. |
| 7,330,161 B2 | 2/2008 | Matsugatani et al. |
| RE40,145 E | 3/2008 | Leighton |
| 7,375,639 B2 | 5/2008 | Dixon et al. |
| 7,460,071 B2 | 12/2008 | Manholm et al. |
| 7,591,415 B2 | 9/2009 | Jesme |
| 7,612,675 B2 | 11/2009 | Miller et al. |
| 7,612,676 B2 | 11/2009 | Yuen et al. |
| 7,714,724 B2 | 5/2010 | Halope et al. |
| 7,714,791 B2 | 5/2010 | Lavedas |
| 7,808,389 B2 | 10/2010 | Finkenzeller |
| 8,098,161 B2 | 1/2012 | Lavedas |
| 8,674,697 B2 | 3/2014 | Apostolos et al. |
| 8,717,242 B2 | 5/2014 | Lavedas et al. |
| 9,484,632 B2 | 11/2016 | Lavedas |
| 9,812,790 B2 | 11/2017 | Lavedas |
| 10,340,965 B2 | 7/2019 | Dolgin et al. |
| 10,963,655 B1 | 3/2021 | Lavedas et al. |
| 2003/0146839 A1 | 8/2003 | Ehlers et al. |
| 2003/0197653 A1 | 10/2003 | Barber et al. |
| 2004/0006424 A1 | 1/2004 | Joyce et al. |
| 2004/0207527 A1 | 10/2004 | Shanks et al. |
| 2005/0093677 A1 | 5/2005 | Forster et al. |
| 2005/0093678 A1 | 5/2005 | Forster et al. |
| 2005/0179604 A1 | 8/2005 | Liu et al. |
| 2005/0212673 A1 | 9/2005 | Forster |
| 2005/0270028 A1 | 12/2005 | Alvarez et al. |
| 2006/0122484 A1 | 6/2006 | Itozaki et al. |
| 2007/0185546 A1 | 8/2007 | Tseng et al. |
| 2008/0231458 A1 | 9/2008 | Fein |
| 2008/0238684 A1 | 10/2008 | Tuttle |
| 2009/0021343 A1 | 1/2009 | Sinha |
| 2009/0034595 A1 | 2/2009 | Kato et al. |
| 2010/0001080 A1 | 1/2010 | Sim et al. |
| 2010/0001914 A1 | 1/2010 | Lavedas |
| 2010/0035563 A1* | 2/2010 | Mikhemar ............... H04B 1/18 455/78 |
| 2010/0069011 A1 | 3/2010 | Carrick et al. |
| 2010/0134291 A1 | 6/2010 | Lavedas |
| 2011/0148733 A1 | 6/2011 | Fahs et al. |
| 2012/0206238 A1 | 8/2012 | Lavedas |
| 2012/0206309 A1 | 8/2012 | Lavedas et al. |
| 2013/0307740 A1 | 11/2013 | Pajona et al. |
| 2014/0070810 A1 | 3/2014 | Robert et al. |
| 2014/0118116 A1 | 5/2014 | Lavedas |
| 2015/0009088 A1 | 1/2015 | Lavedas |
| 2015/0050901 A1* | 2/2015 | Lee ..................... H04B 1/0483 455/127.3 |
| 2018/0041244 A1 | 2/2018 | Ding et al. |
| 2018/0315539 A1 | 11/2018 | Dolgin et al. |
| 2019/0165754 A1 | 5/2019 | Zolomy et al. |
| 2019/0195973 A1 | 6/2019 | Dolgin et al. |
| 2021/0373098 A1 | 12/2021 | Fraundorfer et al. |

FOREIGN PATENT DOCUMENTS

| | | | |
|---|---|---|---|
| JP | 2002372558 A | * | 12/2002 |
| WO | 2005106516 A2 | | 11/2005 |
| WO | 2006107862 A2 | | 10/2006 |
| WO | 2010002821 A1 | | 1/2010 |

OTHER PUBLICATIONS

Morpho Detection, LLC, "ITEMISER DX," Explosives and Narcotics Detection, 2014, 2 pages.

Morpho Detection, Inc., "MobileTrace—Carry More Detection Power," 2013, 4 pages.

Smiths Detection, "Efficient Air Cargo Solutions", 2019, 7 pages.

Smiths Detection, "Your Complete Hold Baggage Solution", 2019, 5 pages.

Smiths Detection, "The Smart Checkpoint Solution", 2019, 11 pages.

L3 Security & Detection Systems, "ProVision 2—Compact Image-free Advanced Personnel Screening", Fact Sheet, 2017, 1 page.

American Science and Engineering, Inc., "Cargo and Vehicle—Multi-View X-ray Screening System", 2009, 2 pages.

Rapiscan Systems, "920 CT," 2018, 2 pages.

Brailovsky et al., "Electronic Control of RFI in a Near-Field Probe Antenna", U.S. Appl. No. 62/348,392, 6 pages.

International Search Report of the International Searching Authority dated Jul. 7, 2021 in connection with International Patent Application No. PCT/US2021/022826, 3 pages.

Written Opinion of the International Searching Authority dated Jul. 7, 2021 in connection with International Patent Application No. PCT/US2021/022826, 8 pages.

International Search Report of the International Searching Authority dated Aug. 4, 2009 in connection with International Patent Application No. PCT/US2009/049136, 4 pages.

Written Opinion of the International Searching Authority dated Aug. 4, 2009 in connection with International Patent Application No. PCT/US2009/049136, 7 pages.

(56) References Cited

OTHER PUBLICATIONS

PCT International Preliminary Report on Patentability of the ISA dated Jan. 5, 2011 in connection with International Patent Application No. PCT/US2009/049136, 8 pages.
Analog Devices, "EMI, RFI, and Shielding Concepts," MT-095 Tutorial, Jan. 2009, 16 pages.
Azcona et al., "Micromachined Electromagnetic Bandgap Crystals as Antenna Substrates for a 500 GHz Imaging Array," 2003, 7 pages.
Clavijo et al., "Design Methodology for Sievenpiper High-Impedance Surfaces: An Artificial Magnetic Conductor for Positive Gain Electrically Small Antennas," IEEE Transactions on Antennas and Propagation, vol. 51, No. 10, 2003, pp. 2678-2690.
"Symbol Technologies Launces Portfolio of RFID Gen 2 and Specialty Tag Inlays," May 2006, 2 pages.
Ukkonen et al., "Effects of Metallic Plate Size on the Performance of Microstrip Patch-Type Tag Antennas for Passive RFID," IEEE Antennas and Wireless Propagation Letters, vol. 4, 2005, pp. 410-413.
Whites et al., "Easily Designed and Constructed High Impedance Surfaces," Department of Electrical and Computer Engineering, South Dakota School of Mines and Technology, 2003, pp. 407-410.
Zetter, "Jamming Tags Block RFID Scanners," Wired Magazine, Mar. 2004, 4 pages.
Abedin, "A Low Profile Dipole Antenna Backed by A Planar EBG Structure," Department of Electrical Engineering, U. of S.C., 2006, pp. 13-16.
Apostolopoulos et al., "Electromagnetic Band Gap Characteristics From Closely Coupled Double Layer and Dipole and Tripole Arrays," The Institute of Electrical Engineers, 2003, pp. 409-412.
Kurs et al., "Wireless Power Transfer via Strongly Coupled Magnetic Resonances," www.sciencemag.org, vol. 317, Jul. 2007, pp. 83-86.
Sievenpiper et al., "High-Impedance Electromagnetic Surfaces With a Forbidden Frequency Band," IEEE Transactions on Microwave Theory and Techniques, vol. 47, No. 11, 1999, pp. 2059-2074.
Symbol the Enterprise Mobility Company, "Two RF Inputs Make a Better RFID Tag," May 2006, 4 pages.

\* cited by examiner

DIFFERENTIAL PROBE WITH SINGLE TRANSCEIVER ANTENNA

TECHNICAL FIELD

This disclosure relates generally to wireless systems. More specifically, this disclosure relates to a differential probe with a single transceiver antenna.

BACKGROUND

Various types of systems use probes having separate antennas to transmit electromagnetic energy and receive electromagnetic energy based on the transmitted electromagnetic energy. For example, some material detection systems use nuclear quadrupole resonance (NQR) spectrometry to determine whether certain materials (such as explosives or narcotics) are present in or on people or objects (such as luggage, cargo containers, or vehicles). In these types of systems, a first antenna can be used to transmit an excitation magnetic field, and a separate second antenna can be used to receive NQR signals from the people or objects being scanned. Often times, these antennas are implemented using separate loop antennas. The first antenna used to transmit the excitation magnetic field may typically be designed to maximize the excitation magnetic field, and the second antenna used to receive the NQR signals may typically be designed to cancel far-field noise. Other types of near-field sensors and other near-field systems may similarly use separate antennas to transmit and receive wireless signals or other electromagnetic energy.

SUMMARY

This disclosure relates to a differential probe with a single transceiver antenna.

In a first embodiment, an apparatus includes an antenna, a transmitter configured to generate an outgoing electrical signal, and a receiver configured to receive an incoming electrical signal. The apparatus also includes a transformer configured to couple the antenna and the transmitter such that the outgoing electrical signal causes the antenna to radiate outgoing electromagnetic energy, couple the antenna and the receiver such that the incoming electrical signal is based on incoming electromagnetic energy received by the antenna, and electrically isolate the transmitter and the receiver.

In a second embodiment, a method includes providing an outgoing electrical signal to an antenna using a transformer coupled to a transmitter. The method also includes radiating outgoing electromagnetic energy from the antenna based on the outgoing electrical signal. The method further includes receiving incoming electromagnetic energy at the antenna and providing an incoming electrical signal based on the incoming electromagnetic energy to a receiver using the transformer. In addition, the method includes electrically isolating the transmitter and the receiver using the transformer.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1B:
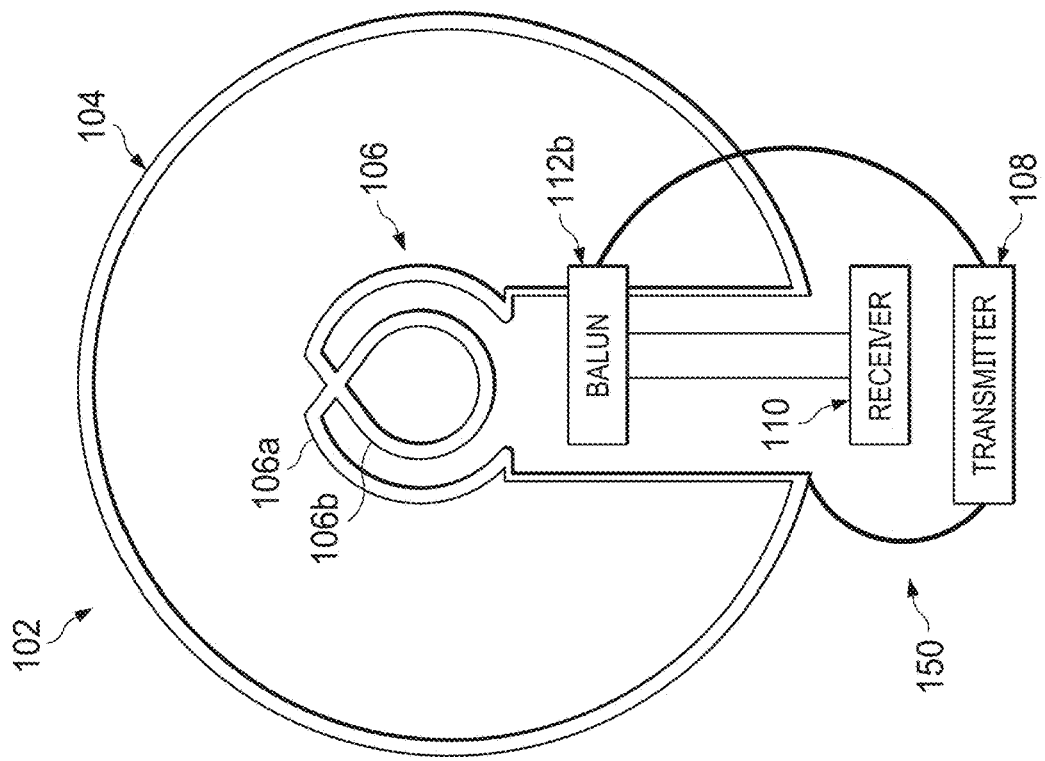
FIGS. 1A and 1B illustrate example differential probes with single transceiver antennas according to this disclosure.

FIGS. 1 through 12, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, various types of systems use probes having separate antennas to transmit electromagnetic energy and receive electromagnetic energy based on the transmitted electromagnetic energy. For example, some material detection systems use nuclear quadrupole resonance (NQR) spectrometry to determine whether certain materials (such as explosives or narcotics) are present in or on people or objects (such as luggage, cargo containers, or vehicles). In these types of systems, a first antenna can be used to transmit an excitation magnetic field, and a separate second antenna can be used to receive NQR signals from the people or objects being scanned. Often times, these antennas are implemented using separate loop antennas. The first antenna used to transmit the excitation magnetic field may typically be designed to maximize the excitation magnetic field, and the second antenna used to receive the NQR signals may typically be designed to cancel far-field noise. Other types of near-field sensors and other near-field systems may similarly use separate antennas to transmit and receive wireless signals or other electromagnetic energy.

Unfortunately, near-field systems with conventional loop antenna-based transmit and receive probes are inherently susceptible to high levels of radio frequency (RF) interference and cross-talk between their transmit and receive circuitries. For example, some near-field systems use differential probes to receive incoming electromagnetic energy while suppressing external noise and interference sources, and separate transmit probes are used in these near-field systems to transmit electromagnetic energy using suitable excitation sources (since differential probes generally make very poor transmitters). The relative placement of the antennas in the transmit and differential probes can be very important in these types of near-field systems, particularly when the transmission power of a near-field system far exceeds the sensitivity of the receiver in the near-field system. As a particular example, in some material detection systems, the transmit power of the material detection systems may be at the kilowatt level, while the receive sensitivity of the material detection systems may be at the microwatt level. In conventional approaches, complex mechanical designs are used for the antennas of the probes. Moreover, cross-talk can become an issue when the operation of one probe affects the operation of another probe. For instance, in some material detection systems, the differential probes when activated may produce weak magnetic fields that can impact operation of the transmit probes, but the transmit probes during operation may drown out these signals in far-field noise.

Overall, the use of two-antenna designs and the need to reduce or minimize cross-talk between probes can complicate the operations of these types of material detection systems. The same types of problems or other similar or related types of problems may exist in other systems that use separate transmit and receive antennas. For example, various problems may exist in radio frequency identification (RFID) systems that use separate antennas to transmit RF signals for interrogating devices and to receive RF responses from the interrogated devices or in near-field communication (NFC) systems that use separate antennas to transmit and receive RF signals used for communications between devices.

This disclosure provides various differential probes with single transceiver antennas. As described in more detail below, each described probe represents a dual-use probe that includes a single antenna used with a transceiver for both transmission of electromagnetic energy (using transmit circuitry of the transceiver) and reception of electromagnetic energy (using receive circuitry of the transceiver). Each probe with its single antenna can be configured to function as a differential probe, which enables effective reception of lower-power electromagnetic energy by the probe. Each probe also has increased transmission efficiency, which enables effective transmission of higher-power electromagnetic energy from the probe. Moreover, each probe includes a transformer-based balun that effectively decouples the higher-power transmit circuitry from the lower-power receive circuitry. This allows the single antenna of each probe to be coupled to the transmit and receive circuitries while having low cross-talk between the transmit and receive circuitries. In some embodiments, diodes or diodes for alternating current (DIACs) can be used in each probe to further increase the isolation between that probe's transmit and receive circuitries.

Among other things, the described probes can support an actuation scheme that enables each probe to subtract contributions of its single antenna's sub-elements while actuated as a receiver and add the contributions of its single antenna's sub-elements while actuated as a transmitter. Also, in some cases, the configuration of each probe's transformer-based balun enables mid-point actuation of that probe. Overall, each probe can be designed to subtract far-field contributions from near-field contributions, which can help to improve near-field measurements. The transformer-based balun of each probe (with or without diodes or DIACs) can also reduce or minimize the cross-talk between that probe's input and output ports for its transmit and receive circuitries, which can also help to improve the near-field measurements. In this way, the described probes can be much more effective in terms of capturing accurate near-field measurements.

This functionality may be used in various types of systems, such as material detection systems, RFID systems, NFC systems, or other systems that transmit and receive wireless signals or other electromagnetic energy. With respect to material detection systems, for example, these systems may be used at any suitable locations, such as civilian transportation centers (like airports and other travel terminals) or military base entry points. Among other things, the material detection systems may be used to help identify smuggling attempts, such as the transport of illicit materials across borders or through specific locations. The material detection systems may also be used to help identify explosives at checkpoints or other locations, where the explosives may be hidden under clothing, in bags/packages/vehicles, buried, or even located inside people. RFID systems can be used in numerous civilian and military locations for security, inventory tracking, or other functions. NFC systems can similarly be used in various locations, such as to support wireless payments, access control, data exchange, or other functions. In general, the described differential probes with single transceiver antennas may be used in any suitable systems and for any suitable purposes.

Figure 1A:
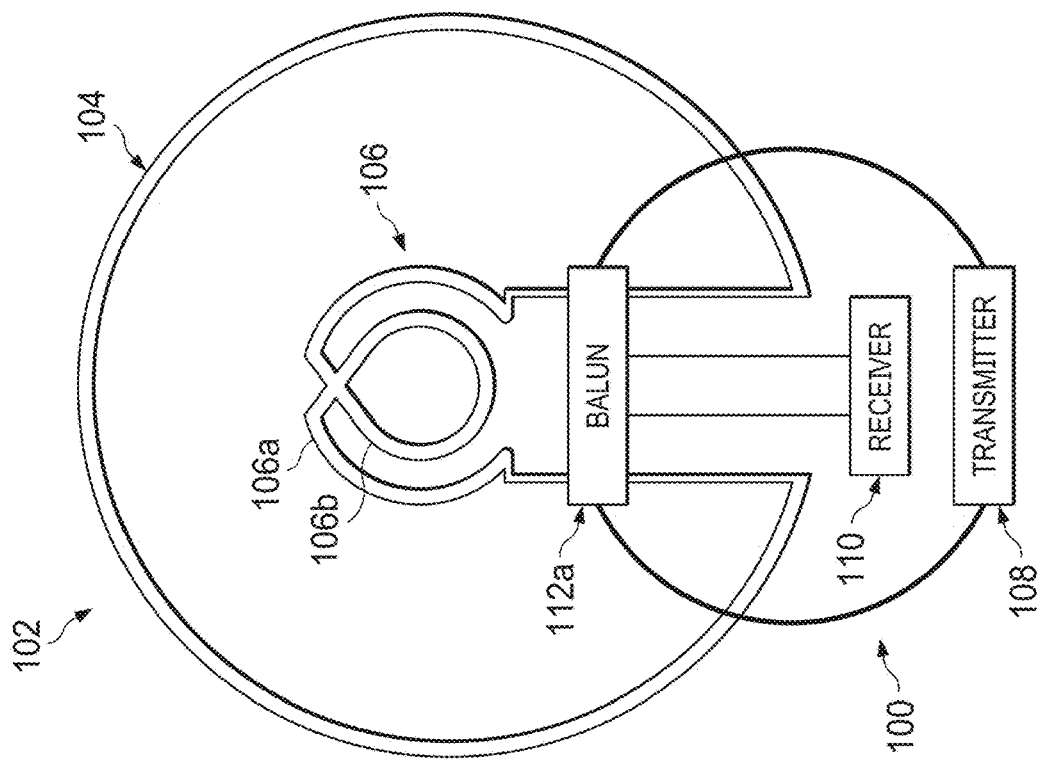

FIGS. 1A and 1B illustrate example differential probes 100, 150 with single transceiver antennas according to this disclosure. As shown in FIG. 1A, the differential probe 100 includes an antenna 102 formed using multiple compensating coils 104 and 106. The outer compensating coil 104 here is larger than the inner compensating coil 106 and is positioned around at least a majority of the compensating coil 106. In some embodiments, the compensating coil 104 may follow a generally circular path around most of the compensating coil 106. Also, in this example, the compensating coil 106 is formed using two loops 106a-106b, where the outer loop 106a is electrically coupled to the compensating coil 104 and the inner loop 106b is electrically coupled to the outer loop 106a. In some embodiments, each loop 106a-106b may follow a generally circular or elliptical path within the antenna 102.

A transmitter 108 and a receiver 110 are coupled to the antenna 102. The transmitter 108 includes transmit circuitry, which generally refers to circuitry configured to generate electrical signals that cause the antenna 102 to radiate outgoing wireless signals or other outgoing electromagnetic energy. The receiver 110 includes receive circuitry, which generally refers to circuitry configured to process electrical signals generated by the antenna 102 based on incoming wireless signals or other incoming electromagnetic energy. The transmitter 108 and the receiver 110 collectively represent a transceiver of the differential probe 100.

A transformer-based balun 112a is coupled across each of the compensating coils 104 and 106 and electrically couples the antenna 102 to the transmitter 108 and the receiver 110. As described in more detail below, voltages that are induced in the compensating coils 104 and 106 during receive operations are applied across transformer coils of the balun 112a, where the transformer coils are wound to yield a difference between these voltages. This allows the probe 100 to function effectively as a differential probe. Moreover, the balun 112a allows the transmitter 108 to drive the antenna 102 effectively during transmit operations, which allows effective transmissions from the probe 100 even though the probe 100 represents a differential probe (in contrast to conventional differential probes, which generally make very poor transmitters). The transformer of the balun 112a may include compensating windings that are coupled to the compensating coils 104 and 106 and the transmitter 108, as well as an output winding coupled to the receiver 110.

In FIG. 1A, the balun 112a is coupled to both ends of the compensating coil 104 and to both ends of the compensating coil 106, and the balun 112a has two electrical connections with the transmitter 108. As a result, the balun 112a in this example can receive the full transmit power of the transmitter 108 and distribute the transmit power to the compensating coils 104 and 106. In FIG. 1B, the differential probe 150 includes many of the same components as the differential probe 100. However, in FIG. 1B, a balun 112b is coupled to one end of the compensating coil 104 and to one end of the compensating coil 106, and the balun 112b has one electrical connection with the transmitter 108. The other electrical connection of the transmitter 108 goes to a common or coupling point that electrically couples the compensating coils 104 and 106 together (which may or may not be located directly between the compensating coils 104 and 106).

In both differential probes 100 and 150, the transmitter 108 can be electrically connected to points where the compensating coils 104 and 106 meet or are otherwise electrically coupled together. The baluns 112a and 112b are used in these differential probes 100 and 150 to effectively isolate the transmitter 108 from the receiver 110. In some embodiments, the baluns 112a and 112b may also include diodes or DIACs that improve the electrical isolation of the transmitter 108 and the receiver 110. The baluns 112a and 112b allow the compensating coils 104 and 106 to be used additively during transmission, which means that the compensating coils 104 and 106 can both be driven by the transmitter 108 and radiate electromagnetic energy during transmission. The baluns 112a and 112b also allow the compensating coils 104 and 106 to be used differentially during reception, which means that the difference between electromagnetic energy as received by the compensating coils 104 and 106 can be used by the receiver 110.

In this way, the differential probes 100 and 150 have the ability to use the same physical loops (the compensating coils 104 and 106) to support additive transmission and differential reception of electromagnetic energy. The baluns 112a and 112b allow this to occur with extremely low or minimized cross-talk between the transmitter 108 and the receiver 110. Also, the differential probes 100 and 150 support the creation of an independent sum port and an independent difference port. The independent sum port represents the input from the transmitter 108 to the antenna 102, and the independent difference port represents the output from the antenna 102 to the receiver 110. The independent sum port can be created through the connection of a power source (the transmitter 108) at locations where the compensating windings of a transformer for the compensating coils 104 and 106 are coupled together. The independent difference port can be created through the output winding of the transformer. Various unique balun configurations are provided below to connect the transmitter 108 and the receiver 110 to the antenna 102 while providing electrical isolation between the transmitter 108 and the receiver 110. As noted above, diodes or DIACs may optionally be used in conjunction with the transformer of the balun 112a or 112b to enhance the electrical isolation between the transmitter 108 and the receiver 110 and to limit the power handling requirements of the balun 112a or 112b.

Although FIGS. 1A and 1B illustrate examples of differential probes 100, 150 with single transceiver antennas, various changes may be made to FIGS. 1A and 1B. For example, various components in FIGS. 1A and 1B may be combined, further subdivided, replicated, omitted, or rearranged and additional components may be added according to particular needs. Also, the sizes, shapes, and dimensions of the various components in FIGS. 1A and 1B can easily vary according to particular needs.

Figure 3:
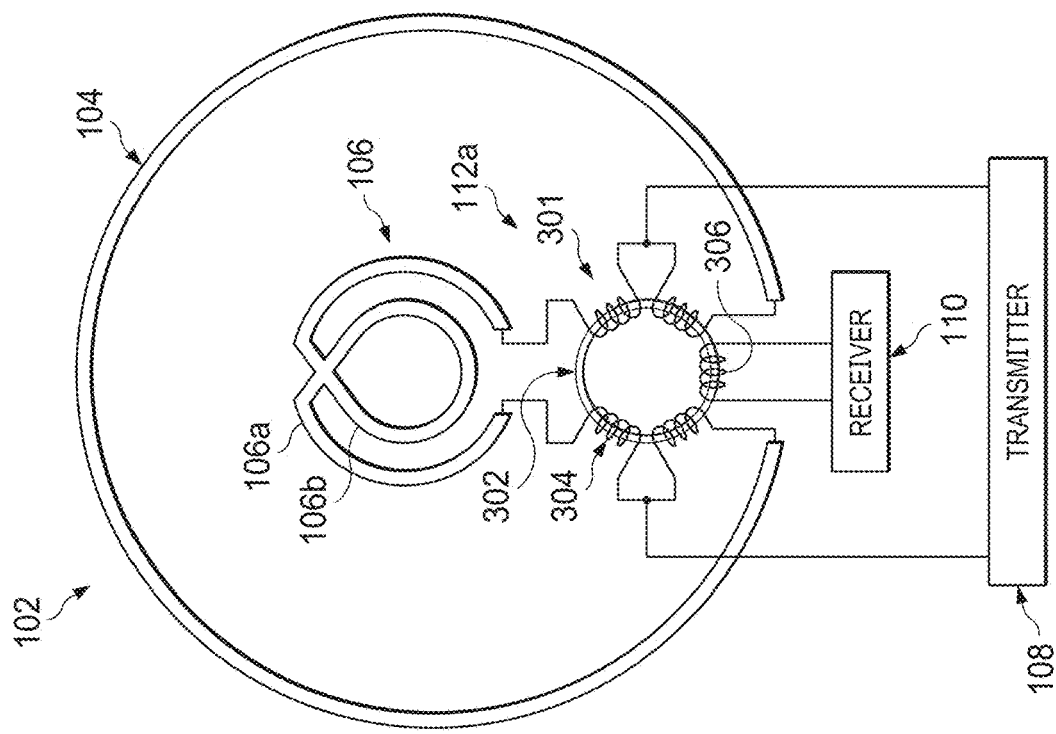
FIGS. 2 through 4 illustrate example types of baluns for use in differential probes with single transceiver antennas according to this disclosure.
Figure 2:
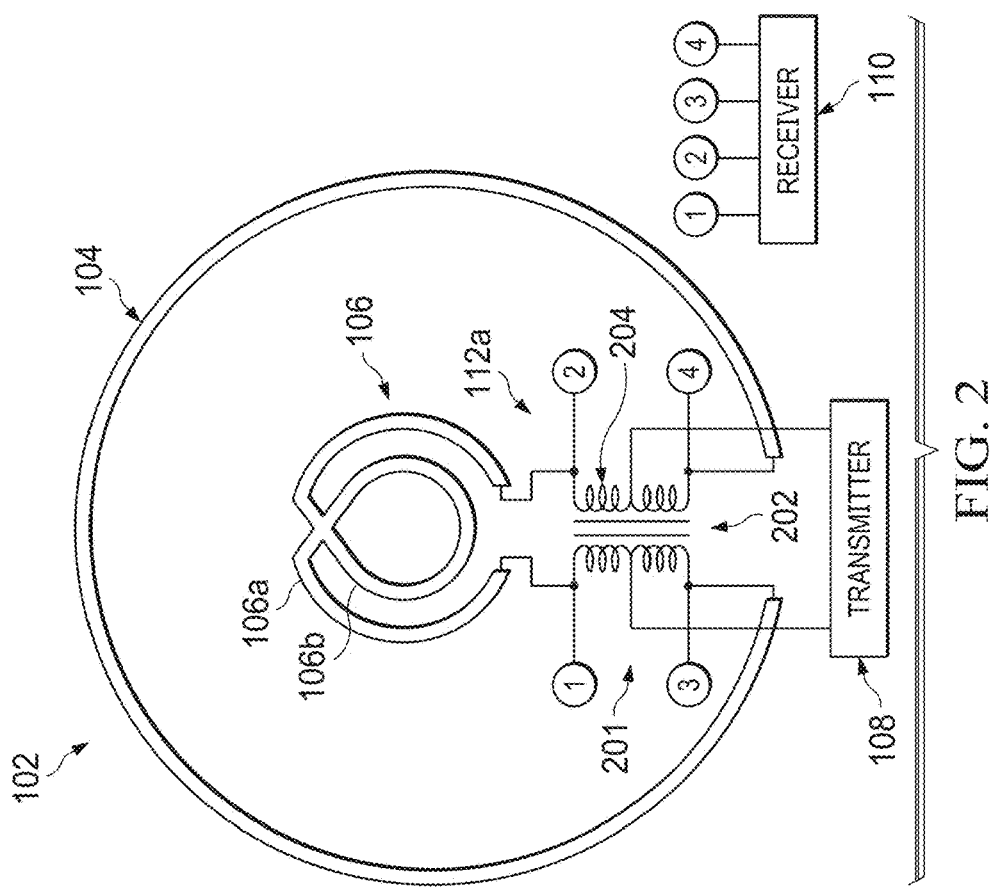
Figure 4:
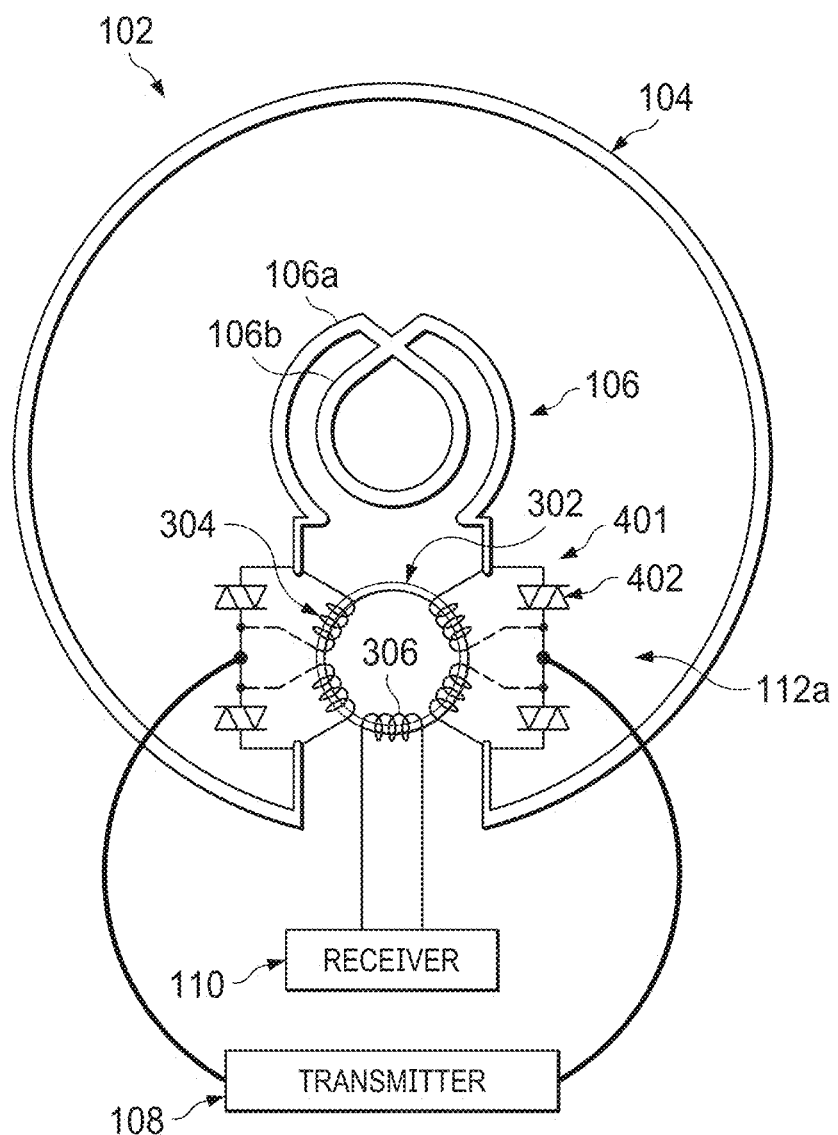

FIGS. 2 through 4 illustrate example types of baluns 112a for use in differential probes 100 with single transceiver antennas according to this disclosure. As shown in FIG. 2, the balun 112a in this example is formed using a transformer 201 having a core 202 and multiple compensating windings 204. The core 202 may be formed from any suitable material(s), such as ferrite. The compensating windings 204 are wound around the core 202 and are coupled to the compensating coils 104 and 106 of the antenna 102, thereby electrically coupling the compensating coils 104 and 106 together. The compensating windings 204 are also coupled to the transmitter 108, which allows the transmitter 108 to provide electrical signals to the compensating coils 104 and 106 via the compensating windings 204. More specifically, the transmitter 108 is coupled to a first pair of compensating windings 204 and a second pair of compensating windings 204. In this example, the transmitter 108 is shown as being coupled to the compensating windings 204 symmetrically, although this is not necessarily required. The compensating windings 204 are further coupled to the receiver 110 via other circuit components, such as to other transformer windings in the manner discussed below, which allows the receiver 110 to receive electrical signals from the compensating coils 104 and 106 via the circuit components. Each compensating winding 204 may be formed from any suitable conductive material(s), such as one or more metals like copper. Each compensating winding 204 may also have any suitable inductance. Note that while two pairs of compensating windings 204 are shown on opposite sides of the transformer 201 here, each side of the transformer 201 may have a single compensating winding 204 (where the transmitter 108 is coupled to a midpoint or other point of each compensating winding 204).

As shown in FIG. 3, the balun 112a in this example is formed using a transformer 301 having a toroidal core 302 and multiple compensating windings 304. The core 302 may be formed from any suitable material(s), such as ferrite. The compensating windings 304 are wound around the toroidal core 302 and are coupled to the compensating coils 104 and 106 of the antenna 102, thereby electrically coupling the compensating coils 104 and 106 together. The compensating windings 304 are also coupled to the transmitter 108, which allows the transmitter 108 to provide electrical signals to the compensating coils 104 and 106 via the compensating windings 304. More specifically, the transmitter 108 is coupled to a first pair of compensating windings 304 and a second pair of compensating windings 304. Note that while two pairs of compensating windings 304 are shown on opposite sides of the transformer 301 here, each side of the transformer 301 may have a single compensating winding 304 (where the transmitter 108 is coupled to a midpoint or other point of each compensating winding 304). An output winding 306 is also wound around the toroidal core 302 and is coupled to the receiver 110, which allows the receiver 110 to receive electrical signals from the compensating coils 104 and 106 via the output winding 306. Each of the windings 304, 306 may be formed from any suitable conductive material(s), such as one or more metals like copper. Each winding 304, 306 may also have any suitable inductance. In some cases, the upper compensating windings 304 may have equal or substantially equal inductances, and the lower compensating windings 304 may have equal or substantially equal inductances.

As shown in FIG. 4, the balun 112a in this example is formed using a transformer 401 having the toroidal core 302 and the windings 304, 306. The toroidal core 302 and the windings 304, 306 in FIG. 4 can have the same or similar arrangement as shown in FIG. 3 and discussed above. The transformer 401 also includes diodes or DIACs 402, each of which is electrically coupled in parallel across one of the compensating windings 304 of the transformer 401. The diodes or DIACs 402 also electrically couple the transmitter 108 to the compensating coils 104 and 106. The diodes or DIACs 402 can be used here to transport electrical currents between the transmitter 108 and the compensating coils 104 and 106 and to limit voltages formed across the compensating windings 304 of the transformer 401 during transmit operations. This helps to avoid a requirement for using a transformer that can support higher electrical powers. Moreover, the diodes or DIACs 402 can present high impedances during receive operations, which can help to provide improved isolation between the transmitter 108 and the receiver 110. Note that while two pairs of compensating windings 304 are shown on opposite sides of the transformer 401 here, each side of the transformer 401 may have a single compensating winding 304 (where the transmitter 108 is coupled to a midpoint or other point of each compensating winding 304). In still other cases, the connections between the transmitter 108 and the midpoints or other points of the compensating windings 304 may be omitted (which is why these connections are shown in dashed lines) such that the DIACS 402 are only coupled to the ends of the compensating windings 304.

Although FIGS. 2 through 4 illustrate examples of types of baluns 112a for use in differential probes 100 with single transceiver antennas, various changes may be made to FIGS. 2 through 4. For example, various components in each of FIGS. 2 through 4 may be combined, further subdivided, replicated, omitted, or rearranged and additional components may be added according to particular needs. Also, the sizes, shapes, and dimensions of the various components in each of FIGS. 2 through 4 can easily vary according to particular needs. In addition, while specific circuit components are shown in each of FIGS. 2 through 4, other circuit components that perform the same or similar functions may be used in the baluns 112a.

Figure 5:
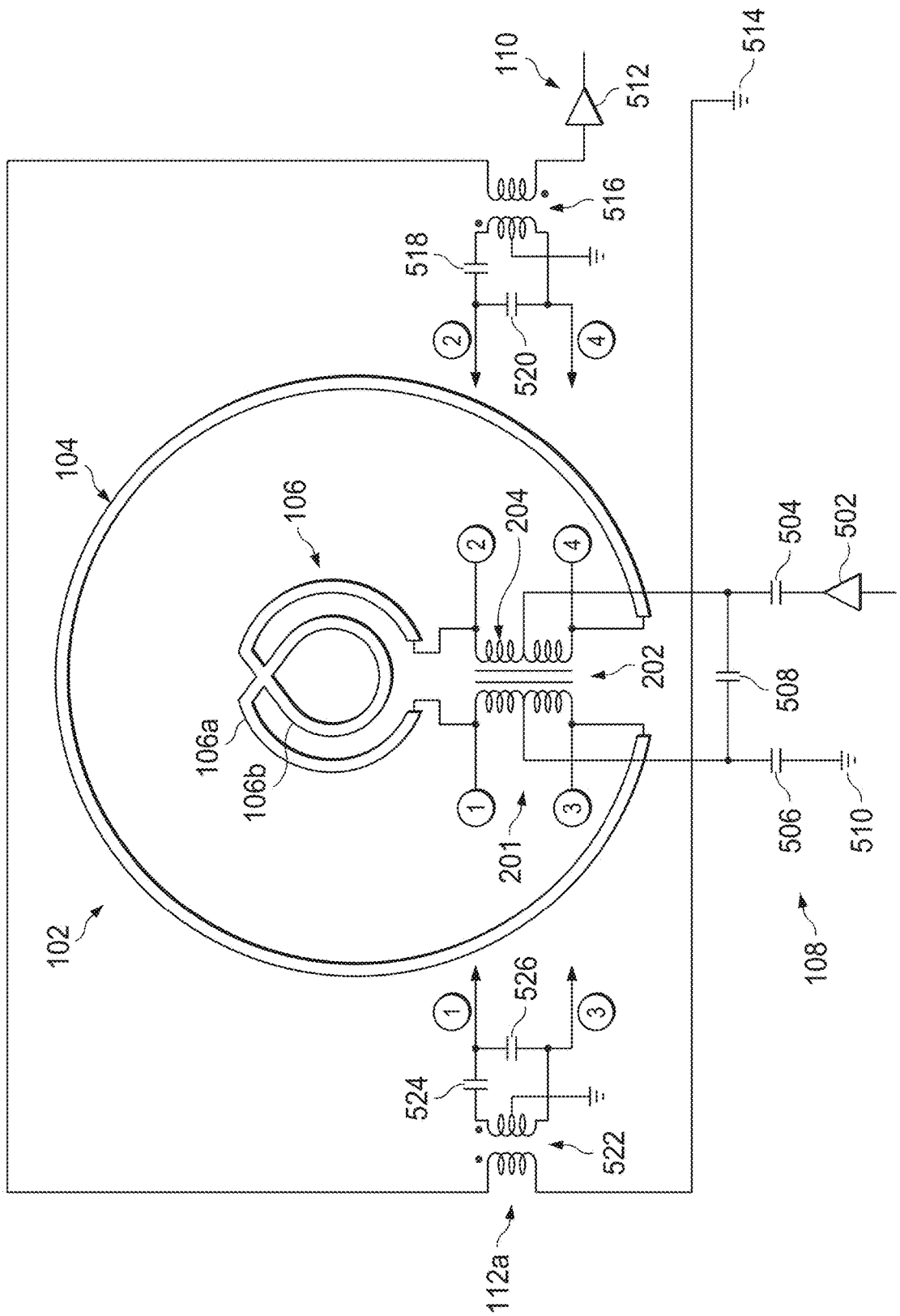
FIGS. 5 through 8 illustrate specific example implementations of baluns and transmit/receive circuitries for use in differential probes with single transceiver antennas according to this disclosure.

FIGS. 5 through 8 illustrate specific example implementations of baluns 112a and transmit/receive circuitries for use in differential probes 100 with single transceiver antennas according to this disclosure. As shown in FIG. 5, the balun 112a represents an example implementation of the balun 112a shown in FIG. 2. The transmitter 108 in this example is implemented using a power amplifier 502 and capacitors 504, 506, and 508. The power amplifier 502 generally represents a structure configured to amplify RF signals or other signals for transmission by the antenna 102. The capacitor 504 is coupled between the power amplifier 502 and some of the compensating windings 204 in the balun 112a, and the capacitor 506 is coupled between a transmit or power ground 510 and others of the compensating windings 204 in the balun 112a. The capacitor 508 is coupled between the capacitors 504, 506 and across the transmitter's inputs to the antenna 102. Each capacitor 504, 506, and 508 represents any suitable capacitive structure providing any suitable capacitance.

The receiver 110 in this example is implemented using a low noise amplifier (LNA) 512. The low noise amplifier 512 generally represents a structure configured to amplify RF signals or other signals that have been received by and output from the antenna 102. The output of the low noise amplifier 512 is referenced to a receive or analog ground 514.

In addition to the transformer core 202 and the compensating windings 204, the balun 112a in this example includes a transformer 516 and capacitors 518 and 520 that couple the low noise amplifier 512 to the compensating coils 104 and 106 and some of the compensating windings 204. The balun 112a also includes a transformer 522 and capacitors 524 and 526 that couple the receive or analog ground 514 to the compensating coils 104 and 106 and others of the compensating windings 204. Each transformer 516 and 522 represents any suitable electrical transformer that electrically isolates components. Each capacitor 518, 520, 524, and 526 represents any suitable capacitive structure providing any suitable capacitance. In this example, the windings of the transformer 516 are shown as having opposite polarities and the windings of the transformer 522 are shown as having common polarities (as represented by the dots in the transformer symbols).

During transmit operations, the power amplifier 502 can amplify an input signal and provide the amplified signal to the right compensating windings 204 in the balun 112a via the capacitor 504. The left compensating windings 204 in the balun 112a are coupled to the transmit or power ground 510 via the capacitor 506. This arrangement causes both of the compensating coils 104 and 106 to additively radiate electromagnetic energy. During receive operations, the low noise amplifier 512 can receive an input signal that is based on a difference between (i) a signal as provided from the right compensating windings 204 in the balun 112a and (ii) a signal as provided from the left compensating windings 204 in the balun 112a. This difference is created based on the different polarities of the transformers 516 and 522. The low noise amplifier 512 can amplify this input signal and provide an amplified output signal that is representative of the electromagnetic energy received by the antenna 102. In some embodiments of the balun 112a shown in FIG. 5, equal or substantially equal electrical currents may be generated in the compensating coils 104 and 106.

Figure 6:
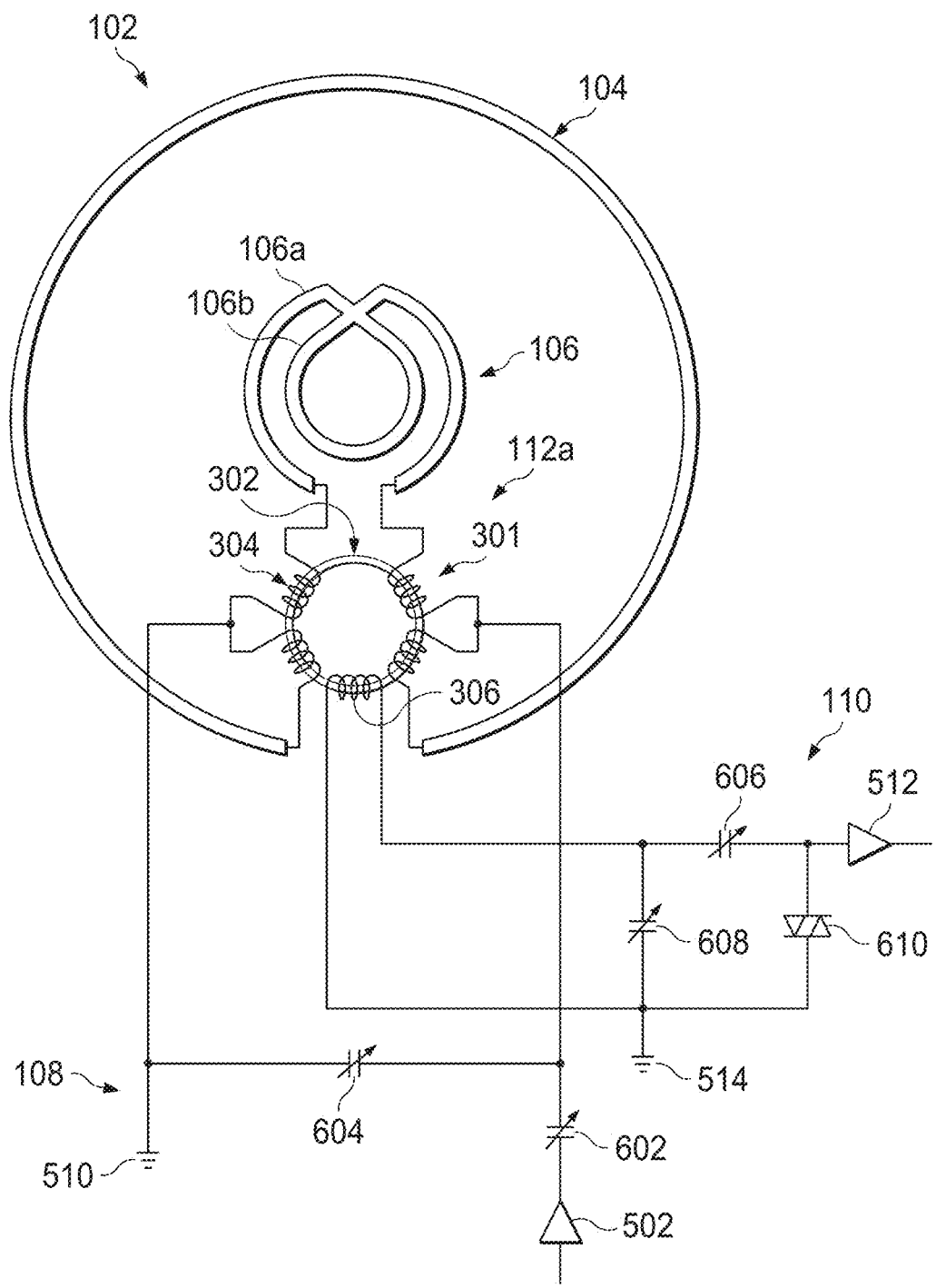

As shown in FIG. 6, the balun 112a represents an example implementation of the balun 112a shown in FIG. 3. The transmitter 108 in this example is implemented using the power amplifier 502 and adjustable capacitors 602 and 604. The adjustable capacitor 602 is coupled between the power amplifier 502 and some of the compensating windings 304 in the balun 112a. The adjustable capacitor 604 is coupled across the transmitter's inputs to the antenna 102. Each adjustable capacitor 602, 604 represents any suitable capacitive structure providing any suitable adjustable or controllable capacitance.

The receiver 110 in this example is implemented using the low noise amplifier 512, adjustable capacitors 606 and 608, and diodes or a DIAC 610. The input of the low noise amplifier 512 is coupled to the adjustable capacitor 606, which is coupled to one side of the output winding 306. The input of the low noise amplifier 512 is also coupled to the diodes or DIAC 610, which is coupled to the other side of the output winding 306. The adjustable capacitor 608 is coupled across the output winding 306 and is coupled across the adjustable capacitor 606 and the diodes or DIAC 610. Each adjustable capacitor 606, 608 represents any suitable capacitive structure providing any suitable adjustable or controllable capacitance.

During transmit operations, the power amplifier 502 can amplify an input signal and provide the amplified signal to the right compensating windings 304 in the balun 112a via the capacitor 602. The left compensating windings 304 in the balun 112a are coupled to the transmit or power ground 510. This arrangement causes both of the compensating coils 104 and 106 to additively radiate electromagnetic energy. During receive operations, the low noise amplifier 512 can receive an input signal that is provided from the output winding 306 of the balun 112a. The output winding 306 here provides the difference between the voltages generated by the compensating coils 104 and 106. The adjustable capacitors 606, 608 and diodes or DIAC 610 can form a receive matching network that provides the difference to the low noise amplifier 512. In some embodiments of the balun 112a shown in FIG. 6, non-equal electrical currents may be generated in the compensating coils 104 and 106.

Figure 7:
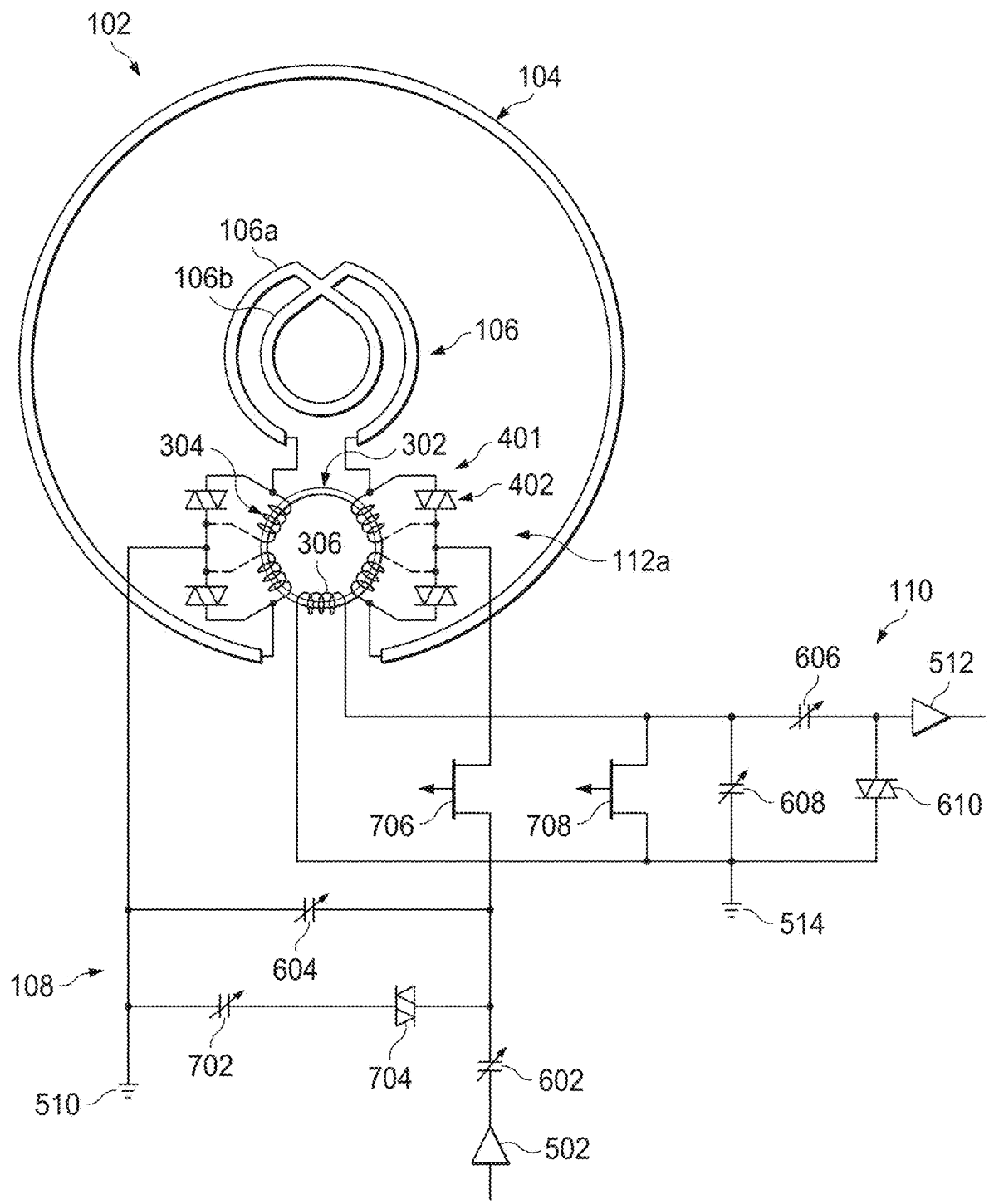

As shown in FIG. 7, the balun 112a represents an example implementation of the balun 112a shown in FIG. 4. The transmitter 108 in this example is implemented using the power amplifier 502 and the adjustable capacitors 602 and 604, along with another adjustable capacitor 702 and diodes or a DIAC 704. Here, the adjustable capacitor 702 is coupled in series with the diodes or DIAC 704, and the adjustable capacitor 702 and the diodes or DIAC 704 are coupled in parallel with the adjustable capacitor 604. The adjustable capacitor 702 represents any suitable capacitive structure providing any suitable adjustable or controllable capacitance. In addition, a switch 706 (such as a transistor) is coupled in series between the transmitter 108 and the right side of the balun 112a. The switch 706 can be used to selective form or break an electrical connection between the transmitter 108 and the balun 112a.

The receiver 110 in this example is implemented using the low noise amplifier 512, the adjustable capacitors 606 and 608, and the diodes or DIAC 610. The receiver 110 also includes a switch 708 (such as a transistor) coupled across the output winding 306 of the balun 112a. The switch 708 can be used to selective form or break an electrical connection that short-circuits the output winding 306 of the balun 112a and that short-circuits the other components of the receiver 110.

During transmit operations, the switch 706 can be closed, the switch 708 can be opened, and the power amplifier 502 can amplify an input signal and provide the amplified signal to the right compensating windings 304 and the right diodes or DIACs 402 in the balun 112a via the capacitor 602. The left compensating windings 304 and the left diodes or DIACs 402 in the balun 112a are coupled to the transmit or power ground 510. This arrangement causes both of the compensating coils 104 and 106 to additively radiate electromagnetic energy. The use of the diodes or DIACs 402 helps to limit the voltages and currents present within the toroidal core 302 of the balun 112a. On each of the right and left sides of the balun 112a, for instance, there may be a positive voltage across the upper diodes or DIAC 402 and a negative voltage across the lower diodes or DIAC 402, resulting in a voltage of about zero volts at the output winding 306. During receive operations, the switch 706 can be opened, the switch 708 can be closed, and the low noise amplifier 512 can receive an input signal that is provided from the output winding 306 of the balun 112a. The output winding 306 here provides the difference between the voltages generated by the compensating coils 104 and 106. In some embodiments of the balun 112a shown in FIG. 7, non-equal electrical currents may be generated in the compensating coils 104 and 106.

Figure 8:
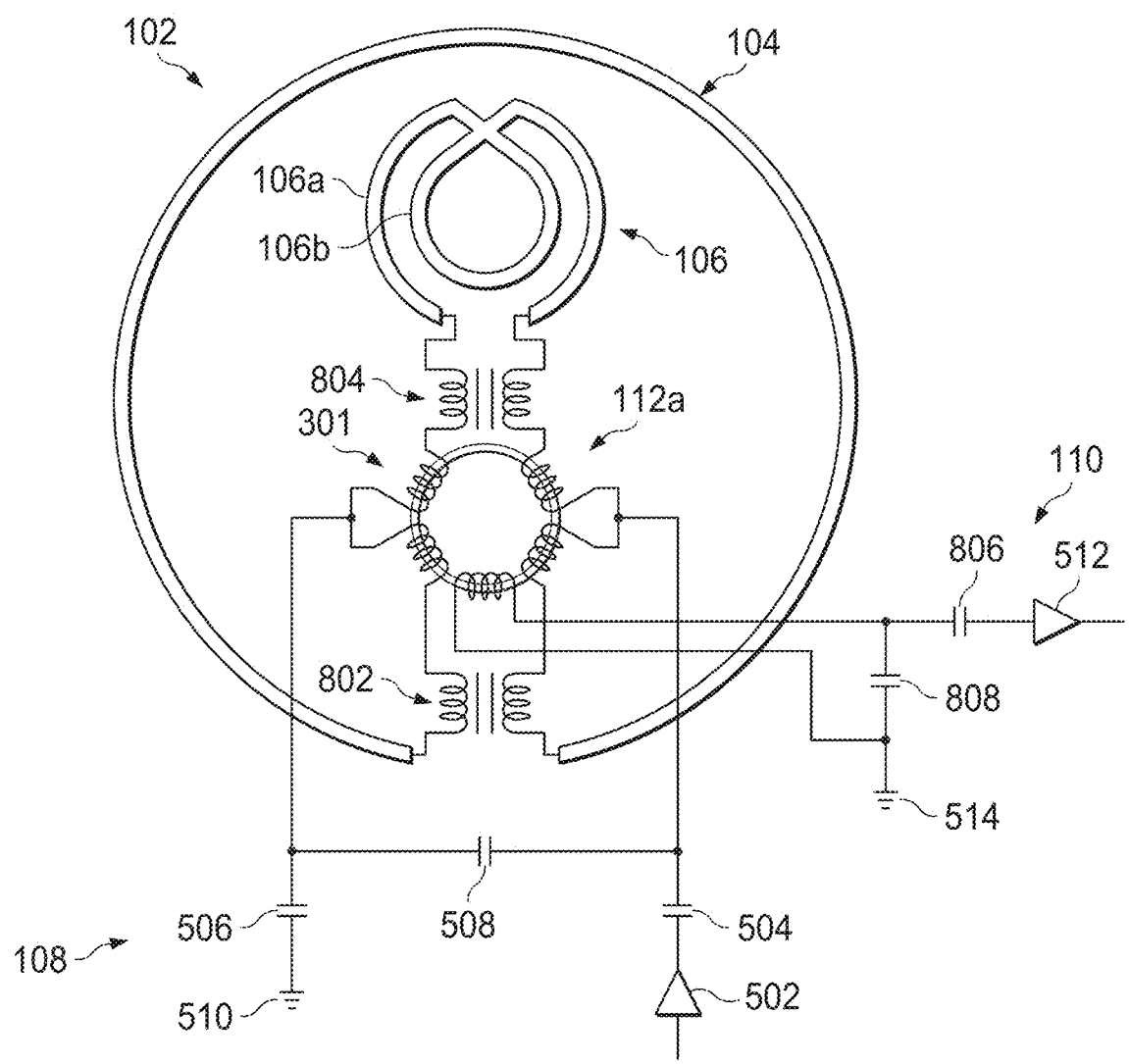

Note that while FIGS. 3 through 7 have illustrated the use of a balun 112a with a single transformer, a combination of transformers may also be used in the balun 112a. For example, as shown in FIG. 8, the balun 112a may include the transformer 301 (which may also represent the transformer 401) coupled in series between two transformers 802 and 804. Here, the transformer 802 couples the transformer 301 to the compensating coil 104, and the transformer 804 couples the transformer 301 to the compensating coil 106. In this example, the receiver 110 includes a capacitor 806 coupled to the input of the low noise amplifier 512, as well as a capacitor 808 coupled across the output winding of the transformer 301. In some embodiments of the balun 112a shown in FIG. 8, non-equal electrical currents may be generated in the compensating coils 104 and 106.

Although FIGS. 5 through 8 illustrate specific examples of implementations of baluns 112a and transmit/receive circuitries for use in differential probes 100 with single transceiver antennas, various changes may be made to FIGS. 5 through 8. For example, various components in each of FIGS. 5 through 8 may be combined, further subdivided, replicated, omitted, or rearranged and additional components may be added according to particular needs. Also, the sizes, shapes, and dimensions of the various components in each of FIGS. 5 through 8 can easily vary according to particular needs. Further, while specific circuit components are shown in each of FIGS. 5 through 8, other circuit components that perform the same or similar functions may be used in the baluns 112a. In addition, any suitable combination of features shown in FIGS. 5 through 8 may be used together in a single differential probe, whether or not that specific combination of features is shown in FIGS. 5 through 8 or described above (such as when a transmitter, receiver, or balun from one figure is used in another figure).

Figure 10:
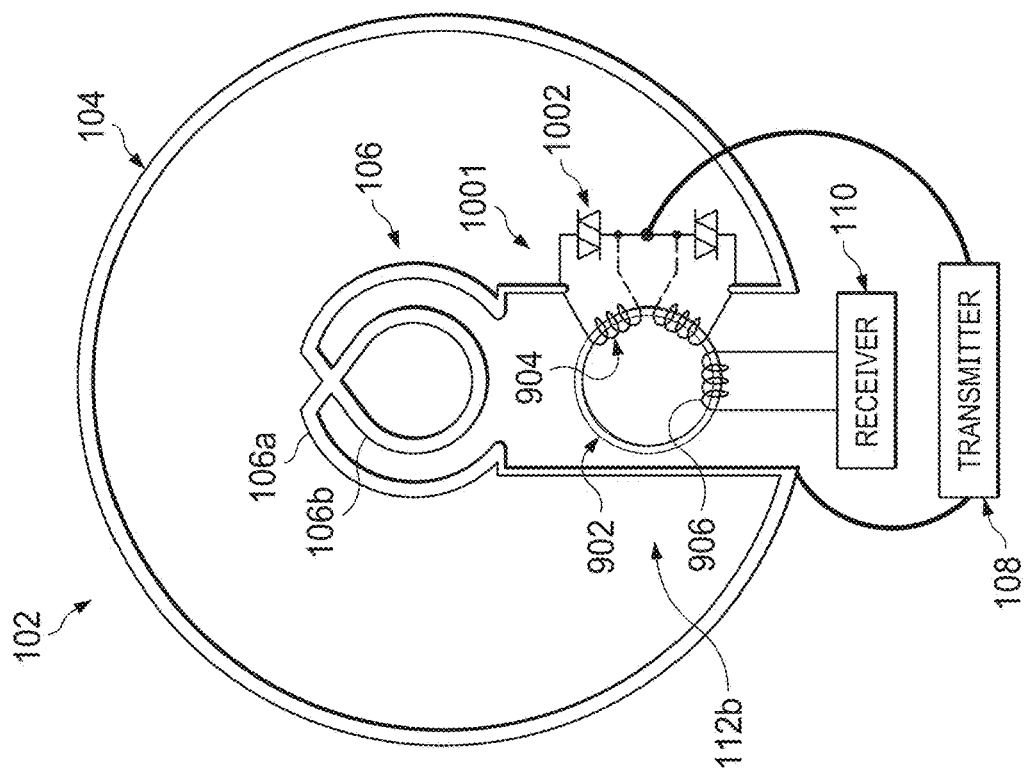
FIGS. 9 and 10 illustrate other example types of baluns for use in differential probes with single transceiver antennas according to this disclosure.
Figure 9:
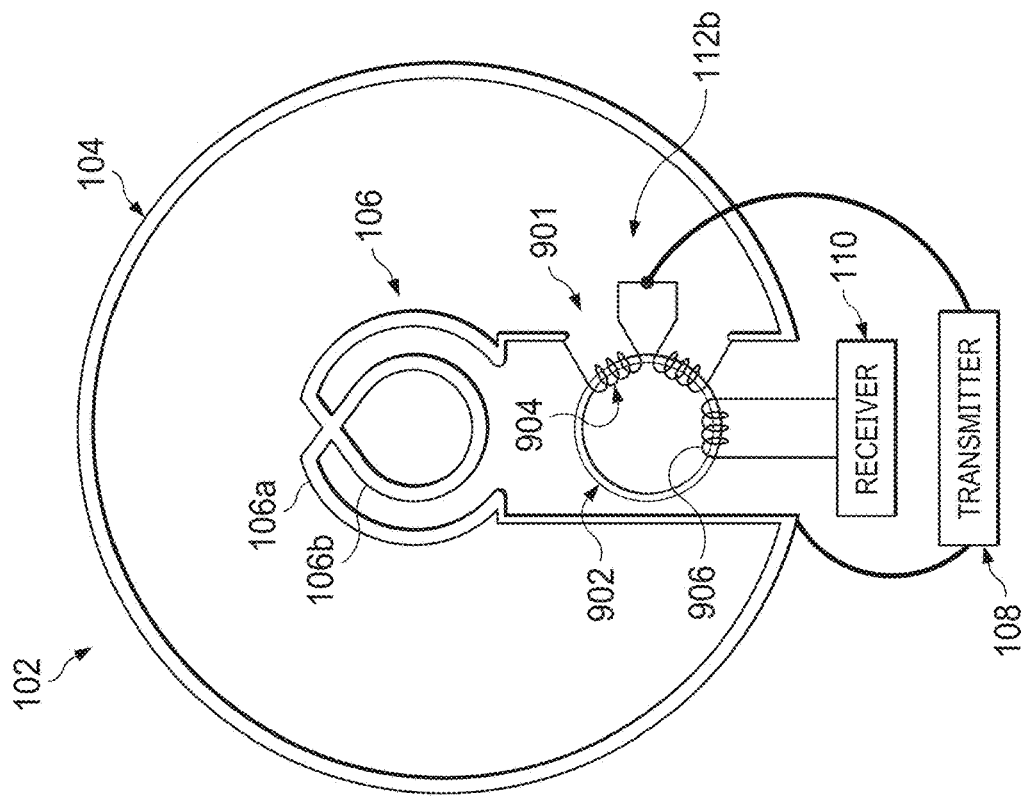

FIGS. 9 and 10 illustrate other example types of baluns 112b for use in differential probes 150 with single transceiver antennas according to this disclosure. As shown in FIG. 9, the balun 112b in this example is formed using a transformer 901 having a toroidal core 902 and multiple compensating windings 904. The core 902 may be formed from any suitable material(s), such as ferrite. The compensating windings 904 are wound around the toroidal core 902 and are coupled to the compensating coils 104 and 106 of the antenna 102, thereby electrically coupling the compensating coils 104 and 106 together. More specifically, the transmitter 108 is coupled to one pair of compensating windings 904. Each compensating winding 904 may be formed from any suitable conductive material(s), such as one or more metals like copper. Each compensating winding 904 may also have any suitable inductance. In some cases, the compensating windings 304 may have equal or substantially equal inductances. Note that while one pair of compensating windings 904 is shown on one side of the transformer 901 here, the transformer 901 may have a single compensating winding 904 (where the transmitter 108 is coupled to a midpoint or other point of the compensating winding 904).

Unlike FIG. 3, only one end of the compensating coil 104 and one end of the compensating coil 106 in FIG. 9 are coupled together by the compensating windings 904 of the transformer 901. The other ends of the compensating coils 104 and 106 are coupled together directly. Also, in this example, one connection to the transmitter 108 is made using the compensating windings 904, and another connection to the transmitter 108 is made directly to the compensating coils 104 and 106. An output winding 906 is coupled to the receiver 110 and may have any suitable inductance.

As shown in FIG. 10, the balun 112b in this example is formed using a transformer 1001 having the toroidal core 902 and the windings 904, 906. The toroidal core 902 and the windings 904, 906 in FIG. 10 can have the same or similar arrangement as shown in FIG. 9 and discussed above. The transformer 1001 also includes diodes or DIACs 1002, each of which is electrically coupled in parallel across one of the compensating windings 904 of the transformer 1001. The diodes or DIACs 1002 also electrically couple the transmitter 108 to the compensating coils 104 and 106. The diodes or DIACs 1002 can be used here to transport electrical currents between the transmitter 108 and the compensating coils 104 and 106 and to limit voltages formed across the compensating windings 904 of the transformer 1001 during transmit operations. This helps to avoid a requirement for using a transformer that can support higher electrical powers. Moreover, the diodes or DIACs 1002 can present high impedances during receive operations, which can help to provide improved isolation between the transmitter 108 and the receiver 110. Note that while one pair of compensating windings 904 is shown on one side of the transformer 901 here, the transformer 901 may have a single compensating winding 904 (where the transmitter 108 is coupled to a midpoint or other point of the compensating winding 904). In still other cases, the connection between the transmitter 108 and the midpoint or other point of the compensating winding 904 may be omitted (which is why these connections are shown in dashed lines) such that the DIACS 1002 are only coupled to the ends of the compensating winding 904.

Although FIGS. 9 and 10 illustrate other examples of types of baluns 112b for use in differential probes 150 with single transceiver antennas, various changes may be made to FIGS. 9 and 10. For example, various components in each of FIGS. 9 and 10 may be combined, further subdivided, replicated, omitted, or rearranged and additional components may be added according to particular needs. Also, the sizes, shapes, and dimensions of the various components in each of FIGS. 9 and 10 can easily vary according to particular needs. In addition, while specific circuit components are shown in each of FIGS. 9 and 10, other circuit components that perform the same or similar functions may be used in the baluns 112b.

Figure 11:
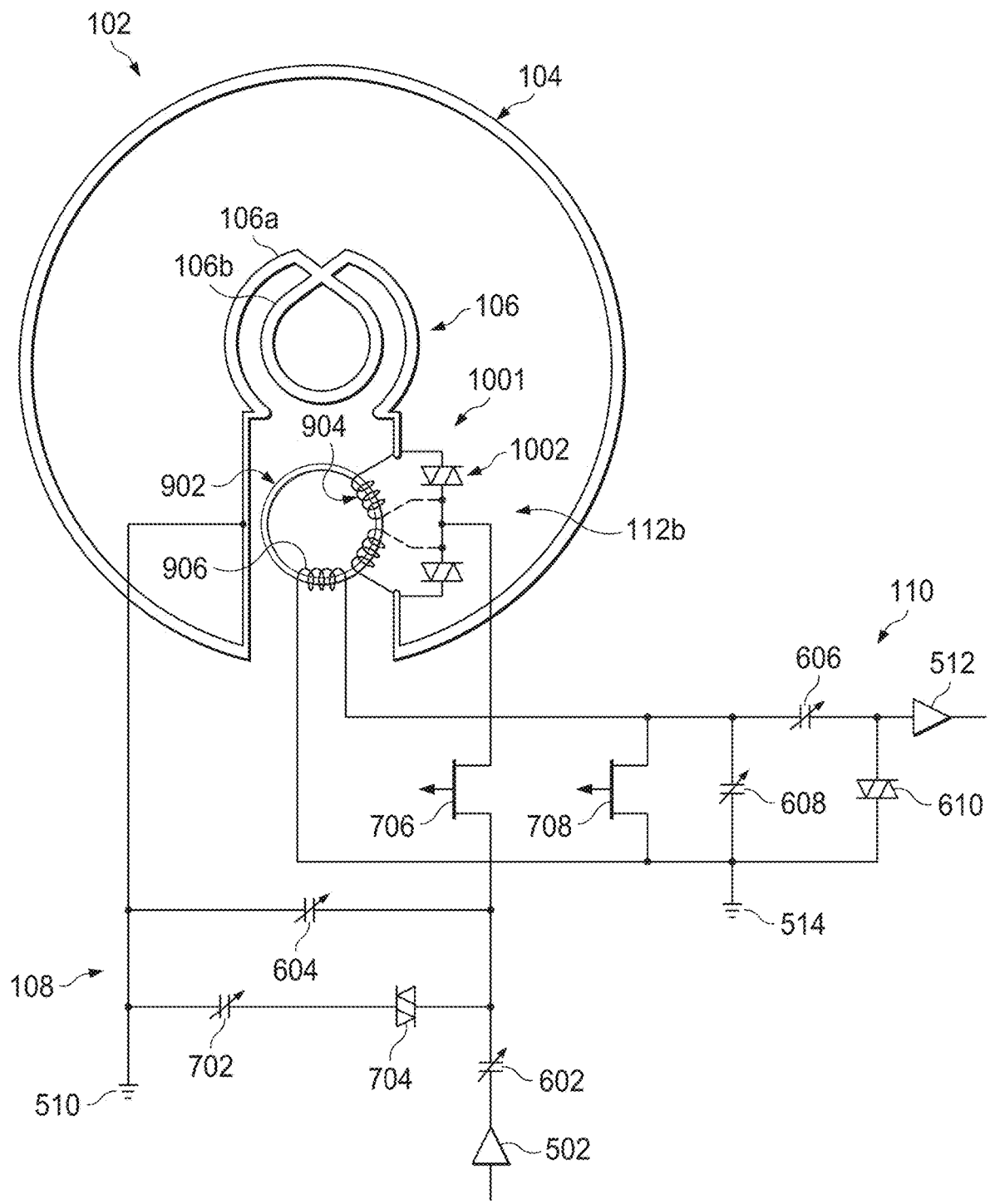
FIG. 11 illustrates other specific example implementations of a balun and transmit/receive circuitries for use in differential probes with single transceiver antennas according to this disclosure.

FIG. 11 illustrates other specific example implementations of a balun 112b and transmit/receive circuitries for use in differential probes 150 with single transceiver antennas according to this disclosure. As shown in FIG. 11, the balun 112b represents an example implementation of the balun 112b shown in FIG. 10. The transmitter 108 and the receiver 110 in this example are implemented using the same components shown in FIG. 7 and described above.

During transmit operations, the switch 706 can be closed, the switch 708 can be opened, and the power amplifier 502 can amplify an input signal and provide the amplified signal to the compensating windings 904 and the diodes or DIACs 1002 in the balun 112b via the capacitor 602. The compensating windings 904 and the diodes or DIACs 1002 feed one end of the compensating coil 104 and one end of the compensating coil 106. The other ends of the compensating coils 104 and 106 are coupled to the transmit or power ground 510. This arrangement causes both of the compensating coils 104 and 106 to additively radiate electromagnetic energy. The use of the diodes or DIACs 1002 helps to limit the voltages and currents present within the toroidal core 902 of the balun 112b. During receive operations, the switch 706 can be opened, the switch 708 can be closed, and the low noise amplifier 512 can receive an input signal that is provided from the output winding 906 of the balun 112b. The output winding 906 here provides the difference between the voltages generated by the compensating coils 104 and 106.

Although FIG. 11 illustrates other specific examples of implementations of a balun 112b and transmit/receive circuitries for use in differential probes 150 with single transceiver antennas, various changes may be made to FIG. 11. For example, various components in FIG. 11 may be combined, further subdivided, replicated, omitted, or rearranged and additional components may be added according to particular needs. Also, the sizes, shapes, and dimensions of the various components in FIG. 11 can easily vary according to particular needs. Further, while specific circuit components are shown in FIG. 11, other circuit components that perform the same or similar functions may be used in the baluns 112b. In addition, any suitable combination of features shown in FIGS. 5 through 8 and 11 may be used together in a single differential probe, whether or not that specific combination of features is shown in FIGS. 5 through 8 and 11 or described above (such as when a transmitter, receiver, or balun from one figure is used in another figure).

Note that the differential probes 100, 150 and the various embodiments of the differential probes 100, 150 described above may be used in various types of systems, such as material detection systems, RFID systems, and NFC systems. Material detection systems may be implemented in various forms, such as tables, walk-in or walk-thru structures, drive-in or drive-thru structures, portable structures, robotic structures, or vehicle-mounted structures. Specific examples of different ways in which material detection systems may be implemented can be found, for instance, in U.S. patent application Ser. No. 17/204,777 filed on Mar. 17, 2021 (which is hereby incorporated by reference in its entirety). RFID systems may also be implemented in various forms, such as access control, security, inventory tracking, logistics, personnel identification, or other systems. NFC systems may further be implemented in various forms, such as wireless credit/debit card payment, wireless data transfer, access control, or other systems.

Figure 12:
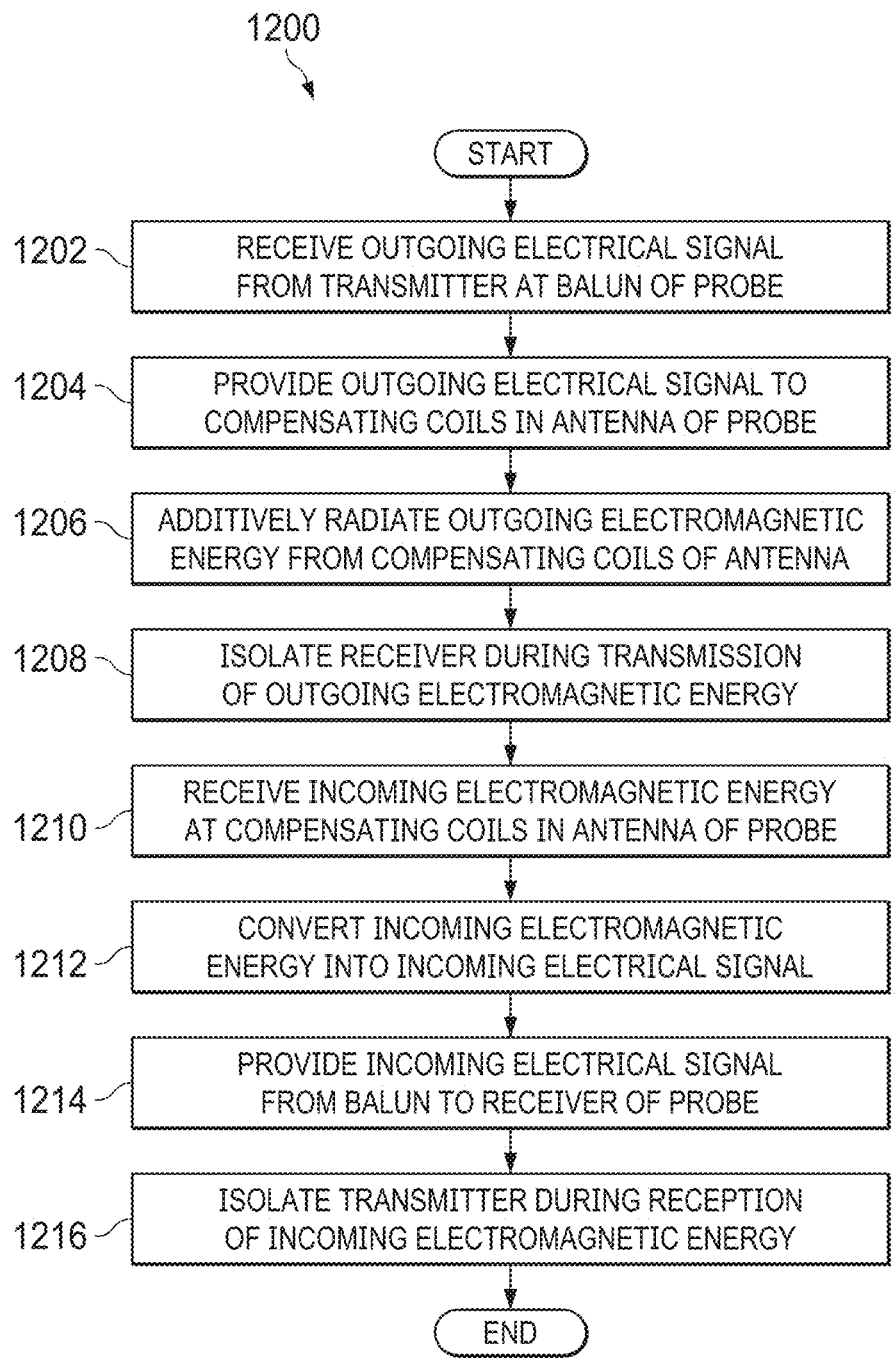
FIG. 12 illustrates an example method for using a differential probe with a single transceiver antenna according to this disclosure.

FIG. 12 illustrates an example method 1200 for using a differential probe with a single transceiver antenna according to this disclosure. For ease of explanation, the method 1200 is described as being performed using the differential probe 100 or 150 of FIG. 1A or 1B, which may be implemented in various ways as described above. However, the method 1200 may be performed using any other suitable differential probe designed in accordance with this disclosure.

As shown in FIG. 12, an outgoing electrical signal is received at a balun from a transmitter of the probe step 1202. This may include, for example, the transmitter 108 providing an electrical signal to the balun 112a or 112b. The transmitter 108 may have two electrical connections to the balun 112a or a single electrical connection to the balun 112b and another electrical connection to an antenna of the probe. The outgoing electrical signal is provided to compensating coils of the antenna of the probe at step 1204. This may include, for example, the balun 112a or 112b providing the electrical signal to the compensating coils 104 and 106 of the antenna 102 via the transformer 201, 301, 401, 901, 1001 of the balun 112a or 112b. This causes the compensating coils of the antenna to additively radiate outgoing electromagnetic energy at step 1206. This may include, for example, the compensating coils 104 and 106 radiating wireless signals or other electromagnetic energy based on the electrical signal received from the transmitter 108 via the balun 112a or 112b. During the transmission of the outgoing electromagnetic energy, the balun helps to isolate a receiver of the probe from the transmitter at step 1208.

Incoming electromagnetic energy is received at the compensating coils of the antenna at step 1210. This may include, for example, the compensating coils 104 and 106 receiving wireless signals or other electromagnetic energy. The incoming electromagnetic energy is converted into an incoming electrical signal at step 1212, and the incoming electrical signal is provided to the receiver of the probe at step 1214. This may include, for example, the balun 112a or 112b outputting an incoming electrical signal through an output winding that forms a part of the transformer in the balun 112a or 112b, where the incoming electrical signal is based on a difference between electrical signals generated by the compensating coils 104 and 106 of the antenna 102. This may also include the receiver 110 receiving the incoming electrical signal and using the incoming electrical signal for some specified purpose. During the reception of the incoming electromagnetic energy, the balun helps to isolate the transmitter from the receiver at step 1216.

Although FIG. 12 illustrates one example of a method 1200 for using a differential probe with a single transceiver antenna, various changes may be made to FIG. 12. For example, while shown as a series of steps, various steps in FIG. 12 may overlap, occur in parallel, occur in a different order, or occur any number of times.

The following describes example embodiments of this disclosure that implement or relate to a differential probe with a single transceiver antenna. However, other embodiments may be used in accordance with the teachings of this disclosure.

In a first embodiment, an apparatus includes an antenna, a transmitter configured to generate an outgoing electrical signal, and a receiver configured to receive an incoming electrical signal. The apparatus also includes a transformer configured to couple the antenna and the transmitter such that the outgoing electrical signal causes the antenna to radiate outgoing electromagnetic energy, couple the antenna and the receiver such that the incoming electrical signal is based on incoming electromagnetic energy received by the antenna, and electrically isolate the transmitter and the receiver.

In a second embodiment, a method includes providing an outgoing electrical signal to an antenna using a transformer coupled to a transmitter. The method also includes radiating outgoing electromagnetic energy from the antenna based on the outgoing electrical signal. The method further includes receiving incoming electromagnetic energy at the antenna and providing an incoming electrical signal based on the incoming electromagnetic energy to a receiver using the transformer. In addition, the method includes electrically isolating the transmitter and the receiver using the transformer.

Any single one or any suitable combination of the following features may be used with the first or second embodiment. The antenna may include inner and outer compensating coils. The inner and outer compensating coils may be configured to additively radiate the outgoing electromagnetic energy, and the incoming electrical signal may be based on a difference between the incoming electromagnetic energy as received by the inner and outer compensating coils. The transformer may include a core and one or more compensating windings wound around the core, where the one or more compensating windings couple the transmitter to the inner and outer compensating coils of the antenna. The transformer may include an output winding wound around the core, where the output winding is coupled to the receiver and is configured to provide the incoming electrical signal to the receiver. The transformer may include a core, one or more compensating windings wound around the core where the one or more compensating windings electrically couple the transmitter to the antenna, and diodes or DIACs coupled in parallel with the one or more compensating windings and coupling the transmitter to the antenna. A balun that includes the transformer may be coupled to opposite ends of the inner compensating coil, and the balun may be coupled to opposite ends of the outer compensating coil. A balun that includes the transformer may be coupled to one end of the inner compensating coil and to one end of the outer compensating coil, and the transmitter may be coupled to another end of the inner compensating coil and to another end of the outer compensating coil. A first switch may be configured to selectively form or break an electrical connection between the transmitter and the transformer, and a second switch may be configured to selectively form or break an electrical connection across an output winding of the transformer, where the output winding is coupled to the receiver and is configured to provide the incoming electrical signal to the receiver. A balun may include the transformer and at least one additional transformer coupled in series, where one of the transformers is coupled to the outer compensating coil and another of the transformers is coupled to the inner compensating coil. The antenna, transmitter, receiver, and transformer may form at least part of a probe that is configured to capture near-field measurements while suppressing far-field noise.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    an antenna;
    a transmitter configured to generate an outgoing electrical signal;
    a receiver configured to receive an incoming electrical signal; and
    a transformer configured to:
        couple the antenna and the transmitter such that the outgoing electrical signal causes the antenna to radiate outgoing electromagnetic energy;
        couple the antenna and the receiver such that the incoming electrical signal is based on incoming electromagnetic energy received by the antenna; and
        electrically isolate the transmitter and the receiver;
    wherein:
        the antenna comprises inner and outer compensating coils;
        the inner and outer compensating coils are configured to additively radiate the outgoing electromagnetic energy; and
        the incoming electrical signal is based on a difference between the incoming electromagnetic energy as received by the inner and outer compensating coils.

2. The apparatus of claim 1, further comprising:
    a first switch configured to selectively form or break an electrical connection between the transmitter and the transformer; and
    a second switch configured to selectively form or break an electrical connection across an output winding of the transformer, the output winding coupled to the receiver and configured to provide the incoming electrical signal to the receiver.

3. The apparatus of claim 1, wherein the antenna, transmitter, receiver, and transformer form at least part of a probe that is configured to capture near-field measurements while suppressing far-field noise.

4. An apparatus comprising:
    an antenna;
    a transmitter configured to generate an outgoing electrical signal;
    a receiver configured to receive an incoming electrical signal; and
    a transformer configured to:
        couple the antenna and the transmitter such that the outgoing electrical signal causes the antenna to radiate outgoing electromagnetic energy;
        couple the antenna and the receiver such that the incoming electrical signal is based on incoming electromagnetic energy received by the antenna; and
        electrically isolate the transmitter and the receiver;
    wherein:
        the antenna comprises inner and outer compensating coils; and
        the transformer comprises a core and one or more compensating windings wound around the core, the one or more compensating windings coupling the transmitter to the inner and outer compensating coils of the antenna.

5. The apparatus of claim 4, wherein:
    the inner and outer compensating coils are configured to additively radiate the outgoing electromagnetic energy; and
    the incoming electrical signal is based on a difference between the incoming electromagnetic energy as received by the inner and outer compensating coils.

6. The apparatus of claim 5, wherein the transformer comprises:
    a core;
    one or more compensating windings wound around the core, the one or more compensating windings electrically coupling the transmitter to the antenna; and
    diodes or diodes for alternating current (DIACs) coupled in parallel with the one or more compensating windings and coupling the transmitter to the antenna.

7. The apparatus of claim 4, wherein the transformer further comprises an output winding wound around the core, the output winding coupled to the receiver and configured to provide the incoming electrical signal to the receiver.

8. An apparatus comprising:
    an antenna;
    a transmitter configured to generate an outgoing electrical signal;
    a receiver configured to receive an incoming electrical signal; and
    a transformer configured to:
        couple the antenna and the transmitter such that the outgoing electrical signal causes the antenna to radiate outgoing electromagnetic energy;
        couple the antenna and the receiver such that the incoming electrical signal is based on incoming electromagnetic energy received by the antenna; and
        electrically isolate the transmitter and the receiver;
    wherein the transformer comprises:
        a core;
        one or more compensating windings wound around the core, the one or more compensating windings electrically coupling the transmitter to the antenna; and
        diodes or diodes for alternating current (DIACs) coupled in parallel with the one or more compensating windings and coupling the transmitter to the antenna.

9. An apparatus comprising:
    an antenna;
    a transmitter configured to generate an outgoing electrical signal;
    a receiver configured to receive an incoming electrical signal; and
    a transformer configured to:
        couple the antenna and the transmitter such that the outgoing electrical signal causes the antenna to radiate outgoing electromagnetic energy;
        couple the antenna and the receiver such that the incoming electrical signal is based on incoming electromagnetic energy received by the antenna; and
        electrically isolate the transmitter and the receiver;
    wherein:

the antenna comprises inner and outer compensating coils;
a balun comprising the transformer is coupled to opposite ends of the inner compensating coil; and
the balun is coupled to opposite ends of the outer compensating coil.

10. An apparatus comprising:
an antenna;
a transmitter configured to generate an outgoing electrical signal;
a receiver configured to receive an incoming electrical signal; and
a transformer configured to:
couple the antenna and the transmitter such that the outgoing electrical signal causes the antenna to radiate outgoing electromagnetic energy;
couple the antenna and the receiver such that the incoming electrical signal is based on incoming electromagnetic energy received by the antenna; and
electrically isolate the transmitter and the receiver;
wherein:
the antenna comprises inner and outer compensating coils;
a balun comprising the transformer is coupled to one end of the inner compensating coil and to one end of the outer compensating coil; and
the transmitter is coupled to another end of the inner compensating coil and to another end of the outer compensating coil.

11. An apparatus comprising:
an antenna;
a transmitter configured to generate an outgoing electrical signal;
a receiver configured to receive an incoming electrical signal; and
a transformer configured to:
couple the antenna and the transmitter such that the outgoing electrical signal causes the antenna to radiate outgoing electromagnetic energy;
couple the antenna and the receiver such that the incoming electrical signal is based on incoming electromagnetic energy received by the antenna; and
electrically isolate the transmitter and the receiver;
wherein:
the antenna comprises inner and outer compensating coils; and
a balun comprises the transformer and at least one additional transformer coupled in series, one of the transformers coupled to the outer compensating coil, another of the transformers coupled to the inner compensating coil.

12. A method comprising:
providing an outgoing electrical signal to an antenna using a transformer coupled to a transmitter;
radiating outgoing electromagnetic energy from the antenna based on the outgoing electrical signal;
receiving incoming electromagnetic energy at the antenna;
providing an incoming electrical signal based on the incoming electromagnetic energy to a receiver using the transformer; and
electrically isolating the transmitter and the receiver using the transformer;
wherein:
the antenna comprises inner and outer compensating coils;
the inner and outer compensating coils additively radiate the outgoing electromagnetic energy; and
the incoming electrical signal is based on a difference between the incoming electromagnetic energy as received by the inner and outer compensating coils.

13. The method of claim 12, wherein the transformer comprises a core and one or more compensating windings wound around the core, the one or more compensating windings coupling the transmitter to the inner and outer compensating coils of the antenna.

14. The method of claim 13, wherein the transformer further comprises an output winding wound around the core, the output winding coupled to the receiver and providing the incoming electrical signal to the receiver.

15. The method of claim 12, wherein the transformer comprises:
a core;
one or more compensating windings wound around the core, the one or more compensating windings electrically coupling the transmitter to the antenna; and
diodes or diodes for alternating current (DIACs) coupled in parallel with the one or more compensating windings and coupling the transmitter to the antenna.

16. The method of claim 12, wherein:
a balun comprising the transformer is coupled to opposite ends of the inner compensating coil; and
the balun is coupled to opposite ends of the outer compensating coil.

17. The method of claim 12, wherein:
a balun comprising the transformer is coupled to one end of the inner compensating coil and to one end of the outer compensating coil; and
the transmitter is coupled to another end of the inner compensating coil and to another end of the outer compensating coil.

18. The method of claim 12, further comprising:
using a first switch to selectively form or break an electrical connection between the transmitter and the transformer; and
using a second switch to selectively form or break an electrical connection across an output winding of the transformer, the output winding coupled to the receiver and providing the incoming electrical signal to the receiver.

19. The method of claim 12, wherein a balun comprises the transformer and at least one additional transformer coupled in series, one of the transformers coupled to the outer compensating coil, another of the transformers coupled to the inner compensating coil.

20. The method of claim 12, wherein the antenna, transmitter, receiver, and transformer form at least part of a probe that captures near-field measurements while suppressing far-field noise.

* * * * *